United States Patent
Zimmerman et al.

(10) Patent No.: US 7,251,915 B2
(45) Date of Patent: Aug. 7, 2007

(54) FRAME SYSTEM FOR MOTOR VEHICLE

(75) Inventors: Jim Zimmerman, Grosse Ile, MI (US); Frank McNulty, Rochester Hills, MI (US); Tad Machrowicz, Ortonville, MI (US); Edward Engler, Farmington Hills, MI (US)

(73) Assignee: Pullman Industries, Inc., Troy, MI (US)

( * ) Notice: Subject to any disclaimer, the term of this patent is extended or adjusted under 35 U.S.C. 154(b) by 0 days.

(21) Appl. No.: 11/223,884

(22) Filed: Sep. 9, 2005

(65) Prior Publication Data

US 2006/0059807 A1    Mar. 23, 2006

Related U.S. Application Data

(60) Provisional application No. 60/608,647, filed on Sep. 10, 2004.

(51) Int. Cl.
*E04H 1/00* (2006.01)
(52) U.S. Cl. ............... 52/239; 52/655.1; 52/653.2; 52/735.1
(58) Field of Classification Search .............. 52/735.1, 52/655.1, 239, 684, 653.2, 730.4; 256/203.01, 256/208, 193.01
See application file for complete search history.

(56) References Cited

U.S. PATENT DOCUMENTS

| | | | |
|---|---|---|---|
| 4,660,345 A * | 4/1987 | Browning | ......... 52/653.2 |
| 4,976,490 A | 12/1990 | Gentle | |
| 4,990,383 A * | 2/1991 | Bergstrom et al. | ......... 428/35.9 |
| 5,041,318 A | 8/1991 | Hulls | |
| 5,209,541 A | 5/1993 | Janotik | |
| 5,243,874 A * | 9/1993 | Wolfe et al. | ......... 74/493 |
| 5,318,819 A | 6/1994 | Pai | |
| 5,458,393 A | 10/1995 | Benedyk | |
| 5,720,092 A * | 2/1998 | Ni et al. | ......... 29/421.1 |
| 5,806,919 A | 9/1998 | Davies | |
| 6,068,424 A | 5/2000 | Wycech | |
| 6,276,111 B1 | 8/2001 | Pittman, Sr. et al. | |
| 6,282,790 B1 | 9/2001 | Jaekel et al. | |
| 6,299,246 B1 | 10/2001 | Tomka | |
| 6,332,731 B1 | 12/2001 | Wycech | |
| 6,412,857 B2 | 7/2002 | Jaekel et al. | |
| 6,435,360 B1 * | 8/2002 | Buchmeier | ......... 212/180 |
| 6,532,639 B2 * | 3/2003 | Ni et al. | ......... 29/421.1 |
| 6,668,457 B1 * | 12/2003 | Czaplicki | ......... 29/897.1 |
| 6,892,503 B1 * | 5/2005 | Kang | ......... 52/653.2 |
| 6,926,350 B2 * | 8/2005 | Gabbianelli et al. | ... 296/203.01 |

* cited by examiner

*Primary Examiner*—Richard E. Chilcot, Jr.
*Assistant Examiner*—Basil Katcheves
(74) *Attorney, Agent, or Firm*—Gifford Krass Sprinkle Anderson & Citkowski

(57) ABSTRACT

A frame system for a motor vehicle includes a plurality of frame members each having a connector socket defined therein. The system further includes a connector having an outer profile configured to engage the sockets of two of the frame members so as to connect them in a fixed angular relationship. The connectors are composite bodies including a core member and an exterior body which covers at least a portion of the core member and defines a portion of the outer profile of the connector. Also disclosed are frames which employ the system and methods for manufacturing the frames.

18 Claims, 6 Drawing Sheets

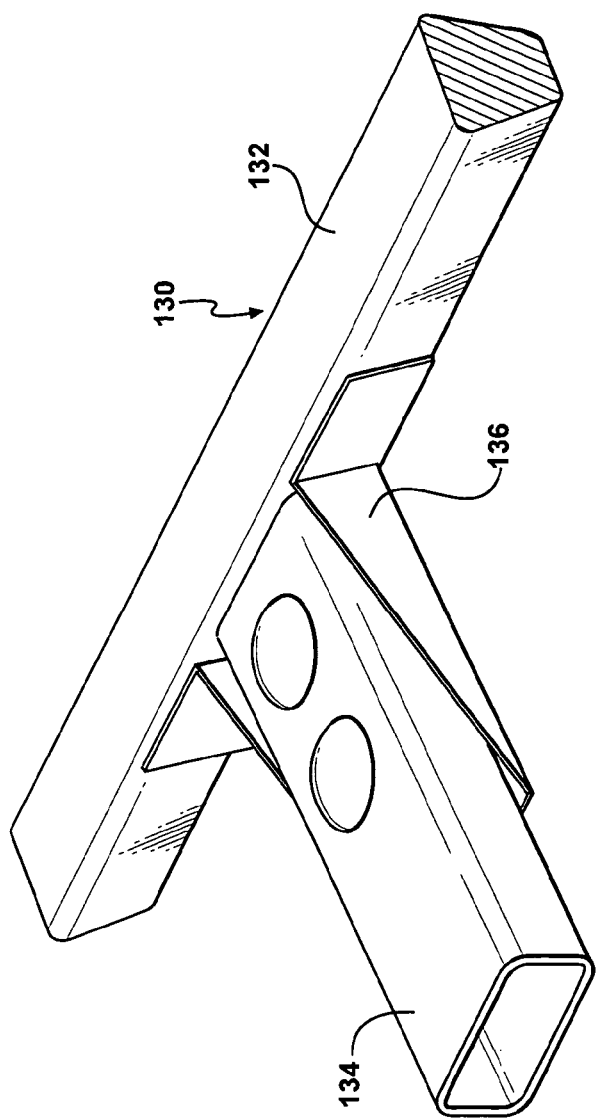
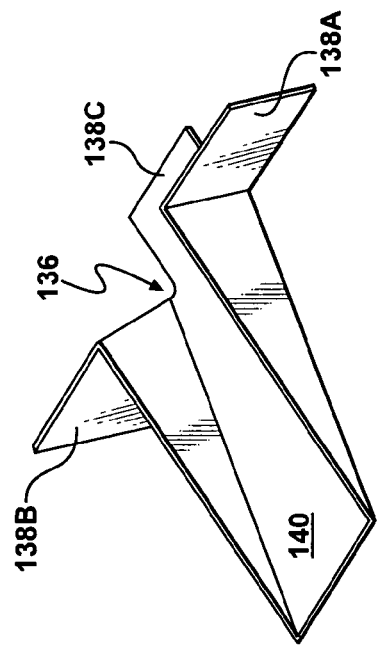
FIG - 14A
FIG - 14B

FRAME SYSTEM FOR MOTOR VEHICLE

RELATED APPLICATION

This application claims priority of U.S. Provisional Patent Application Ser. No. 60/608,647 filed Sep. 10, 2004, entitled "Frame System for Motor Vehicle."

FIELD OF THE INVENTION

This invention relates generally to a system for fabricating a structural frame. More specifically, the invention relates to a system for fabricating a frame for a motor vehicle. Specifically, the invention relates to a modular system for assembling motor vehicle frames.

BACKGROUND OF THE INVENTION

Motor vehicles such as automobiles, trucks and the like generally include a relatively simple, planar, frame structure which supports the engine, drive train and wheels. This frame also supports a body of the vehicle, which is typically fabricated from a number of support pillars which are retained upon the frame and have sheet metal body panels affixed thereto. The assembly of such vehicular bodies is fairly complex and requires specializing tooling and fixtures to enable the placement and welding of the various posts and panels.

The automotive industry is now considering using space frames in the construction of motor vehicle bodies. Space frames have previously been employed in the construction of aircraft, racing cars, and other high performance motor vehicles. A space frame comprises a rigid cage which defines the body of the vehicle and operates to support body panels and other structural elements. Space frames provide a rigid, lightweight, high strength structure which increases the crashworthiness of the vehicle. Space frames for specialty applications such as aircraft and performance vehicles are typically fabricated from welded components; however, such construction is not generally practical for high volume production motor vehicles. Consequently, the industry is looking for other methods for fabricating relatively inexpensive, high strength space frame structures. In one approach, specially designed connectors are employed to join tubes, bars, rails or other such frame members in a precise geometrical relationship so as to assemble the space frame. Space frames of this type are shown, for example, in U.S. Pat. Nos. 6,412,857; 6,276,111; 6,282,790; 5,458,393 and 5,209,541. One problem limiting the use of such technologies is the fact that each particular vehicle style will require a plurality of differently configured connector members. Such connectors must be relatively high in strength, and have precise geometries. Hence, such connectors are typically fabricated from metals or other such high strength materials. This unduly complicates the use of such space frame systems and greatly increases their cost.

As will be explained hereinbelow, the present invention provides a space frame system which utilizes connector members fabricated as composite bodies. The connectors of the present invention are very high in strength, yet are relatively easy to fabricate as high precision items, in large volumes, and at relatively low costs. As a consequence, the present invention provides a practical, low cost, readily reconfigurable space frame system. These and other advantages of the present invention will be apparent from the drawings, discussion and description which follow.

A frame system for a motor vehicle includes a plurality of frame members, each having a connector socket defined therein. The frame system further includes at least one connector. The connector has an outer profile configured to engage the sockets of two of said plurality of frame members so as to connect the frame members in a fixed angular relationship. The connector is a composite body comprising a core member and an exterior body which covers at least a portion of the core member and defines at least a portion of the outer profile of the connector. In specific embodiments, the core and exterior body are fabricated from different materials, and in one particular instance, the core is metal and the exterior body is a polymeric material.

The core may be elongated along the linear axis and the exterior body may cover substantially all of the length of the core, or it may cover only a portion of the length of the core. In some instances, a portion of the core is exposed upon or projects from a surface of the exterior body. The system may include auxiliary connectors configured and operable to retain the connector and frame member in a joined state. In yet other instances, either the frame member or the connector may have a connection feature associated therewith. The connection feature may comprise a mechanical connector such as a raised boss, a locking tooth, or the like, or it may comprise a body of adhesive.

Also disclosed herein is a method of assembling a frame structure for a motor vehicle using the system of the present invention.

BRIEF DESCRIPTION OF THE DRAWINGS

FIGS. 14A and 14B show another frame assembly of the present invention.

DETAILED DESCRIPTION OF THE INVENTION

Figure 1:
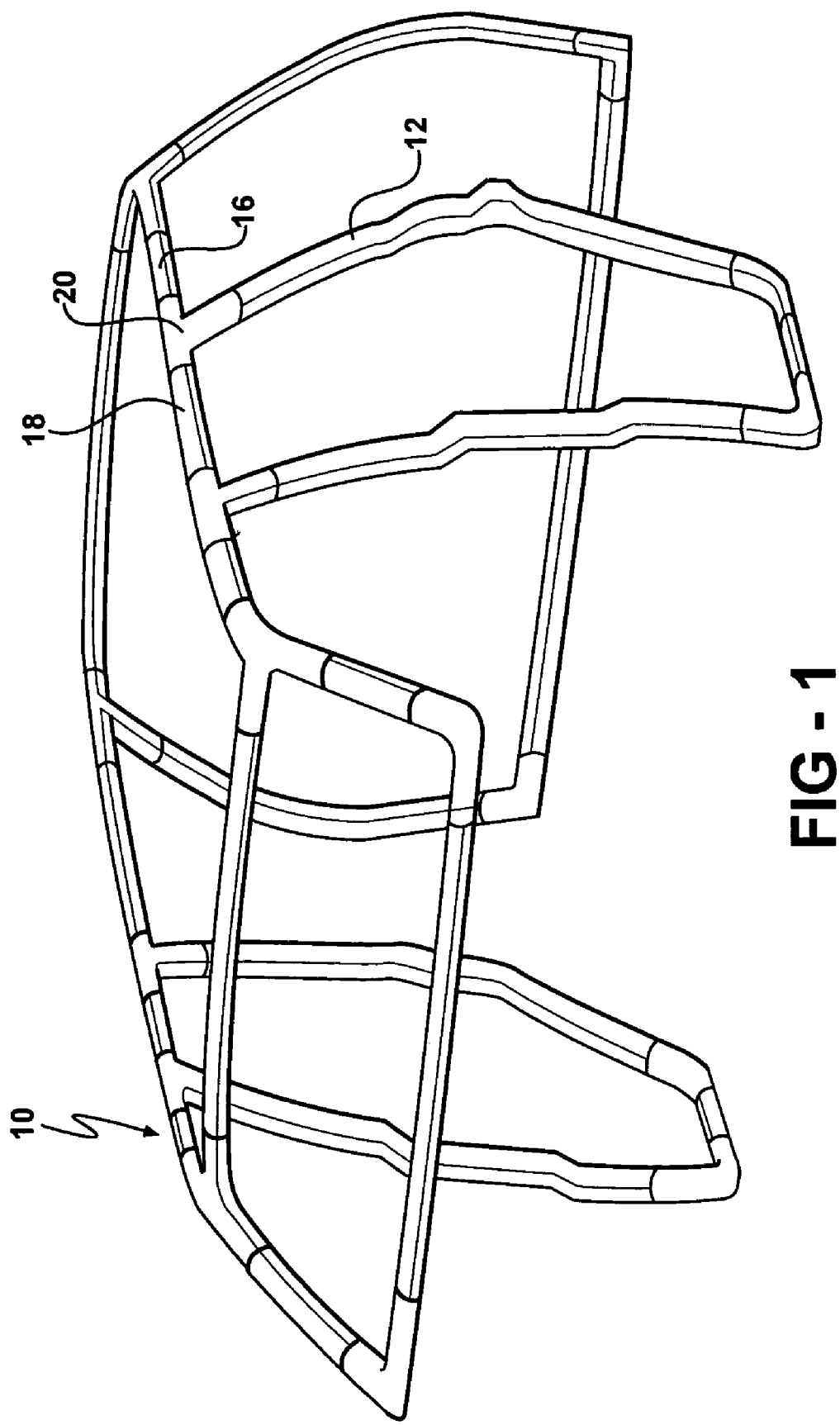
FIG. 1 is a schematic depiction of a space frame assembly for a motor vehicle incorporating the system of the present invention.

The present invention comprises a frame system for a motor vehicle. The frame system includes a plurality of frame members and a plurality of connectors. Each connector is configured so as to join at least two of the frame members together in a fixed angular relationship (which is understood to include a linear relationship). In this manner, frame members can be joined together by the connectors to define a frame of the motor vehicle. Referring now to FIG. 1, there is shown a space frame structure 10 for a motor vehicle in accord with one embodiment of the present invention. The frame structure 10 is fabricated from a plurality of frame members, for example members 12, 16 and 18, which are joined together by a connector, such as connector 20. The frame structure of the present invention, because of its modular nature, provides for flexibility in design, ease of fabrication and low cost. Hence, this system is readily adaptable to high volume production of motor vehicles and the like.

The frame members used in the construction of the space frame of the present invention are typically made from a metal such as steel, but the invention may be practiced utilizing frame members fabricated from other materials such as polymeric materials, composites, and the like. In one group of embodiments of the present invention, the frame members are roll formed from steel. In other instances, the frame members may be stamped, hydroformed, profile shaped, extruded, bent, or otherwise configured. In a typical application, the frame members are relatively lightweight, high strength members. In one specific process, the frame members are fabricated from a hardenable steel by a fabrication process such as roll forming. These members are subsequently hardened by a heat treatment process. In specific applications, the frame members may be selectably hardened so as to produce regions of different hardness thereacross. Such structures can exhibit desirable deformation properties which can enhance their energy attenuation in a crash. Likewise, the articles may be selectably hardened so as to control other physical properties such as vibration and the like. In other embodiments, the frame members may be fabricated from wholly or partially polymeric materials, including fiber-reinforced materials.

Figure 2:
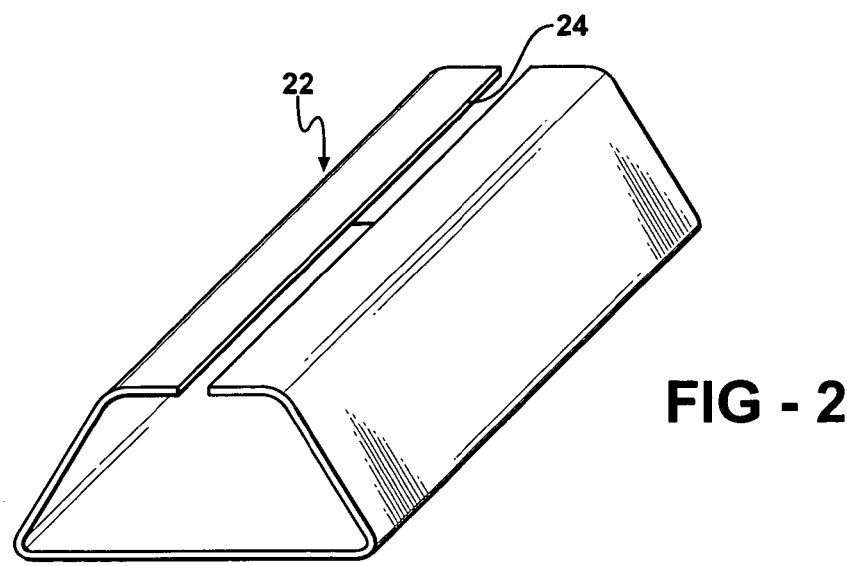
FIGS. 2-4 are depictions of some configurations of frame member which may be utilized in the present invention.
Figure 3:
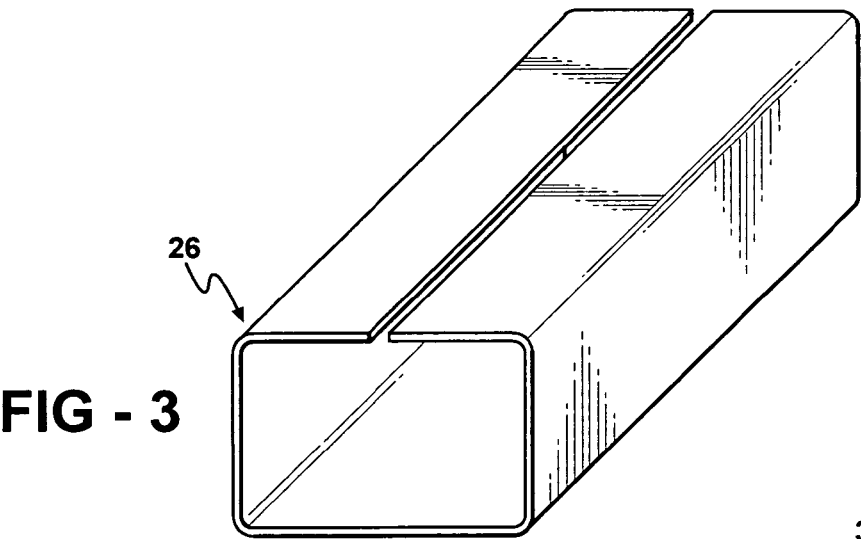

The frame members may be variously configured, and in particular embodiments, the frame members are shaped so as to have a hollow cross-sectional profile. It is to be understood that in the context of this disclosure, a hollow cross-sectional profile means a profile which is defined by a completely closed tube as well as by a tube which may have an open seam, perforations, slits, or other features. For example, referring now to FIG. 2, there is shown one configuration of frame member 22 having a generally trapezoidal cross section. The frame member 22 of FIG. 2 is a closed tube wherein edges thereof are joined together by welding or the like so as to form a seam 24. FIG. 3 depicts another configuration of frame member 26 having a generally C-shaped cross-sectional profile.

Figure 4:
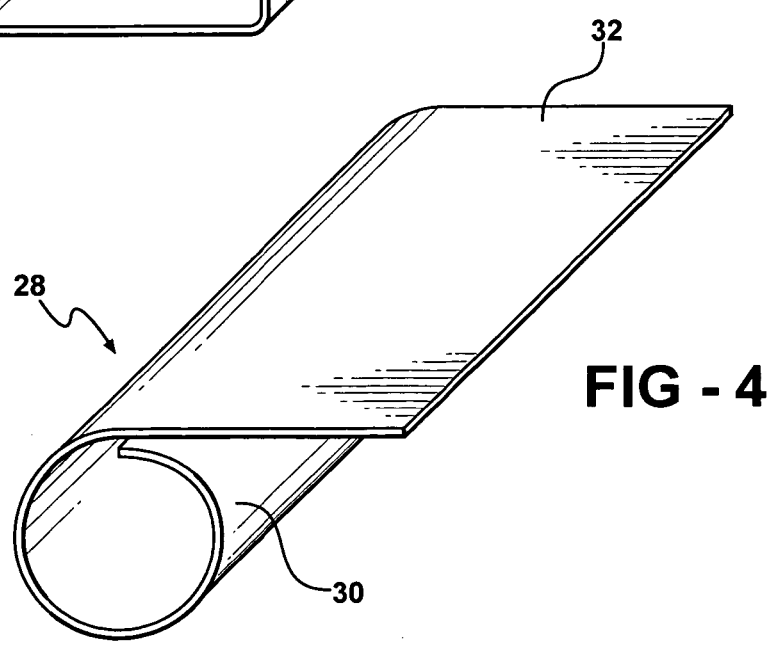

FIG. 4 depicts yet another embodiment of frame member 28 which is a hollow, rolled tube having a "9" shaped cross section. In this embodiment, the main portion of the frame member defines a tubular structure 30. A generally planar tab portion 32 projects therefrom. This tab portion 32 may be employed for the affixation of body panels and other members thereto by welding, adhesive bonding, mechanical affixation or the like. As shown in FIG. 4, the seam portion 34 of the frame member 28 is unwelded, although it is to be understood that in other embodiments this seam may be closed by a weld. Also, the projecting tab portion 32 need not be coextensive with the entire length of the frame member, but may be configured as one or more shorter tabs extending therealong. Also, the tab feature may be incorporated into frame members of other configurations. In yet other embodiments, the frame members may include brackets or other such attachment members which are integrally formed therewith or subsequently attached thereto. In still further embodiments, the frame members may include tapped holes, toggles or other attachment features.

The connectors which are employed in the practice of the present invention may be variously configured depending upon the shape and configuration of the frame members, and the desired configuration of the frame which is to be assembled therefrom. The connectors of the present invention are composite bodies having a core member which provides strength to the connector. The composite connectors further include an exterior body member which covers at least a portion of the core member and defines the outer profile of the connector. The outer profile is configured to mate with a corresponding frame member. In the present invention, the composite connectors couple the functions of strength and profile. In general, the core member of the connector is fabricated from a relatively high strength material such as a metal or very high strength polymer. A single configuration of core member may be utilized for a number of different connectors. The outer body is typically fabricated from a relatively easy to mold material such as a high strength polymer or a low melting point alloy material. The exterior body may be readily molded onto the core by relatively easy to implement, high speed molding processes such as injection molding, die casting, and the like. In this manner, high strength connectors having variously configured profiles may be readily fabricated thereby allowing for the manufacture of variously configured space frame assemblies.

Figure 5:
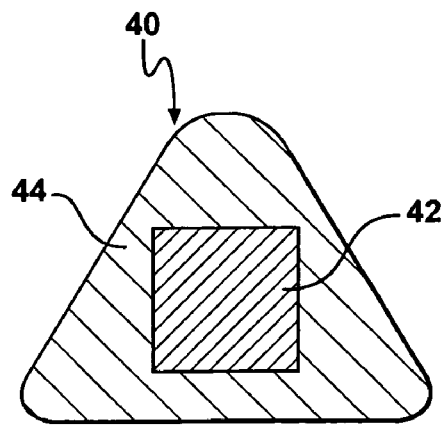
FIGS. 5-8 are cross sections of particular embodiments of connector which may be utilized in the practice of the present invention.

Referring now to FIG. 5, there is shown a cross-sectional view of one embodiment of connector 40 structured in accord with the principles of the present invention. This connector 40 includes a core member 42, which in this embodiment is shown as a member having a generally square cross section. As illustrated in FIG. 5, the core member 42 is a solid piece of material; although, it is to be understood that hollow core members may likewise be employed. In general, the core member 42 is fabricated from a high strength material such as a metal or engineering thermoplastic. Disposed about the core 42 is an exterior body 44 which defines the outer profile of the connector. In this instance, the profile is generally triangular; although, it is to be understood that the exterior profile may be otherwise configured. In general, the material comprising the exterior body 44 is a relatively easy to mold material such as a polymeric material or a low melting point metal alloy.

Figure 6:
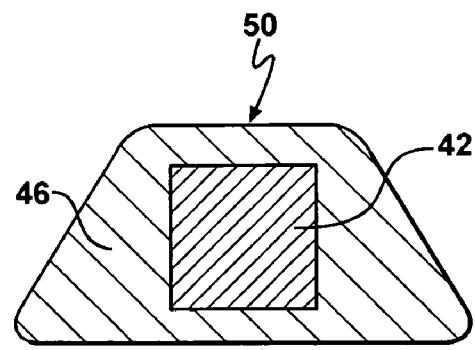

Referring now to FIG. 6, there is shown yet another embodiment of connector 50. This connector 50 includes a core member 42 which is generally similar to the core member of FIG. 5; however, the exterior body 46 is configured to have a trapezoidal cross section. As will be seen, a common core 42 may be utilized for both profiles. In some instances, a connector may be configured so as to join frame members having different profiles and in that regard, a single connector may include an exterior body having multiple profiles.

Figure 7:
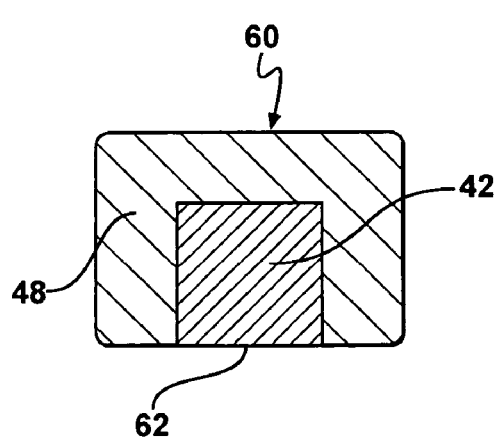

Referring now to FIG. 7, there is shown yet another embodiment of connector 60. This connector 60 includes a core member 42 which is generally similar to the core member of the FIG. 5 and FIG. 6 embodiments. It is notable that in FIG. 7, the exterior body 48 surrounds only a portion of the core member 42 so that a surface of the core member 50 is exposed and defines a portion of the outer profile of the connector. This exposed surface 50 can be utilized as attachment points for welds, brazing and the like.

Figure 8:
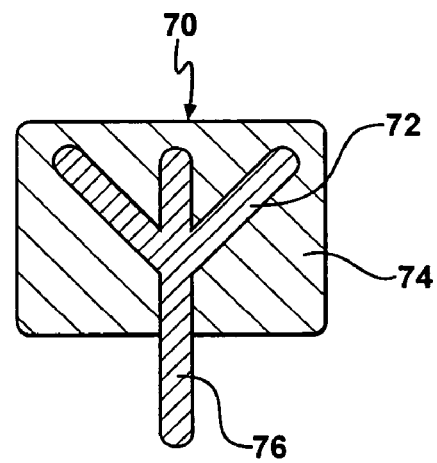

Yet other configurations of connector may be utilized in accord with the principles of the present invention. For example, FIG. 8 shows yet another embodiment of connector 70. This connector 70 includes a core member 72 which, in this embodiment, is a generally trident-shaped body and further includes an exterior body 74 which surrounds the majority of the core 72. However, the exterior body 74 is configured so that a portion of the core 76 projects from the exterior body 74. The projecting portion can be disposed so as to pass into an appropriately configured slot or other opening in a frame member, and can be used as a connection point for body panels, or as a weld point or other coupling point for retaining a frame member, body panel, windshield, or the like. In view of the foregoing, it will be appreciated that yet other configurations of cores and exterior bodies may be utilized.

As will be explained in detail hereinbelow, the connectors and/or the frame members may further include attachment or retention features which aid in maintaining the junction between the connector and frame member.

Figure 9:
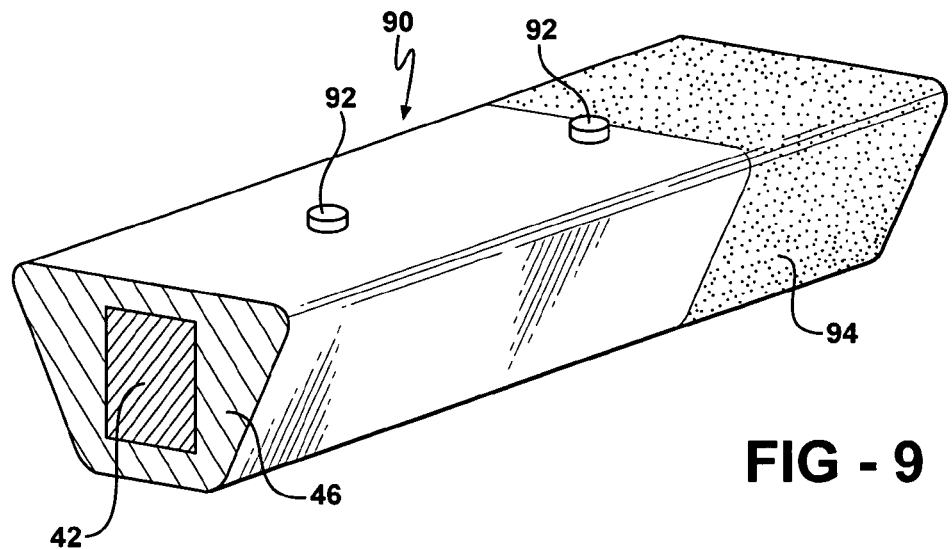
FIG. 9 is a perspective view of one embodiment of connector of the present invention.

Referring now to FIG. 9, there is shown one embodiment of connector 90 which may be employed to establish a linear connection between two frame members which are generally similar to the frame member 22 depicted in FIG. 2, insofar as these frame members will have an approximately trapezoidal cross section. The connector includes a core 42 and exterior body 46 as in the FIG. 6 embodiment. The connector 90 may include features which aid in fixing it to a corresponding frame member. For example, the connector 90 may include one or more attachment bosses 92 which comprise raised features that can mate with corresponding features in frame members and/or establish a frictional fit with the frame members. In other instances, such attachment features may comprise a tooth, a detent, or other such engagement members as is known in the art. In other instances, the connector may include a body of adhesive, or a component of a two-part adhesive, applied thereto. As is shown in FIG. 9, one end of the connector 90 is coated with a body of adhesive material 94. This adhesive may be a contact adhesive, or it may be a curable adhesive such as a heat curable adhesive.

Figure 10:
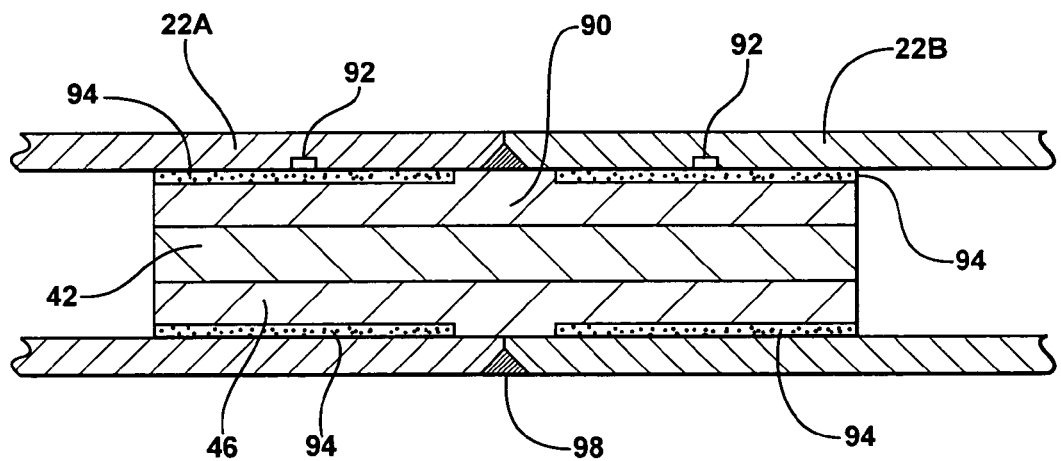
FIG. 10 is a cross-sectional view of a portion of a frame assembly of the present invention showing a connector and portions of two frame members.

Referring now to FIG. 10, there is shown a cross-sectional view of a connector 90, which is generally similar to the connector of FIG. 9, as disposed to join together two frame members 22a, 22b, which are generally similar to the frame member 22 of FIG. 2. Illustrated in FIG. 10 are several modes whereby the frame members 22a, 22b may be interconnected and/or joined to the connector 90. In particular instances, the frame members and connector may be joined in a frictional fit which can be enhanced by features such as the raised connector bosses 92 as discussed above. In yet other instances, the connection may be enhanced by a tooth, projection or other such feature disposed on the frame members themselves.

Bonding of the connector and frame member may also be enhanced by the use of a layer of adhesive material, and as is shown in FIG. 10, a layer of adhesive 94 is disposed on either end of the connector 90. As discussed above, this adhesive may comprise a contact adhesive, or it may be a curable adhesive such as a heat curable adhesive. In yet other instances, further integrity of the frame system may be required, and in such cases, the abutting ends of frame members may be joined together by a weld as is shown at reference numeral 98 herein. In still other instances, the integrity of the joint may be further enhanced by the use of an external connector such as a screw, rivet, or the like which is disposed so as to penetrate the frame member and project in and/or through the connector.

Figure 11:
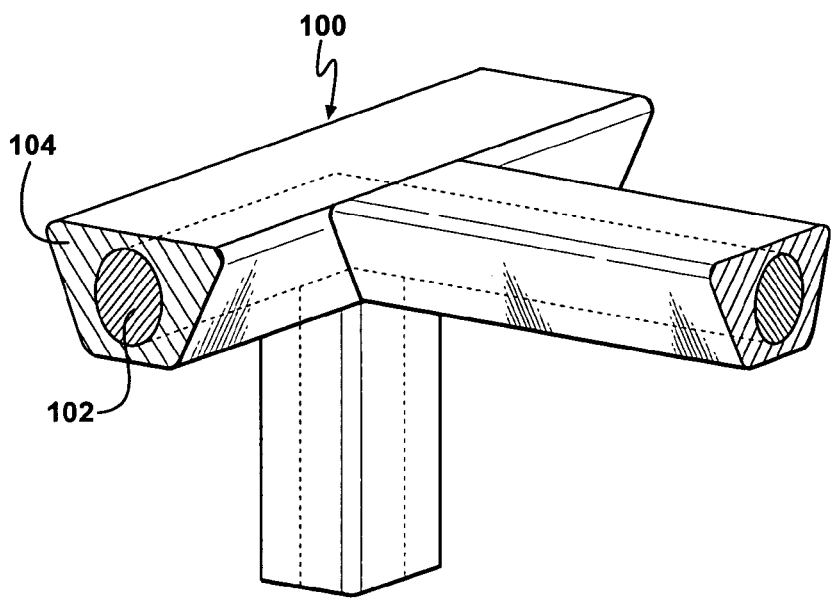
FIG. 11 is a perspective view of another embodiment of connector of the present invention.

It is to be understood that various other configurations of connector may be utilized to assemble variously configured frame structures. Referring now to FIG. 11, there is shown a perspective view of a corner connector as configured to join four tubular frame members together. As illustrated, the connector includes a core 102, which extends therethrough as is shown by the phantom outline, and an exterior body 104. This connector 100 may include enhancements such as frictional bosses, adhesive, and the like as discussed hereinabove with reference to FIGS. 9 and 10. It is to be understood that other configurations of connector will be apparent, and may be employed in the practice of the present invention. In that regard, connectors may be configured so as to join together frame members having different cross-sectional profiles. In some instances, frame members which have a solid cross-sectional profile may be favored for particular applications, and in that regard, the connectors may be configured to include sleeves or sockets which receive these solid members therein. All of such embodiments are within the scope of this invention.

In particular instances, a portion of a reinforcing or coupling member may project from the material forming the remainder of the connector. For example, a metallic pin may be molded so as to project from a connector, and this pin may serve to engage a frame member, or another connector. In other embodiments, a connector may have a tube-like socket member molded therein. This socket may be configured to receive a frame member or another coupler. For example, in some instances a coupler which defines a socket is fitted into a frame member, and a similar arrangement of connector and frame member is joined thereto by a coupler pin which comprises a third member.

In yet other embodiments of the present invention, the connectors themselves may be made modular or customizable. That is to say, a connector may be configured so that it can be assembled from a plurality of individual block members. In this manner, a four-way connector may be assembled by affixing two connector portions to a two-way connector. Such assembly may be made by way of joints such as dovetail joints, connector pins and the like. The integrity of such connectors may be further enhanced by the use of adhesives.

Figure 12:
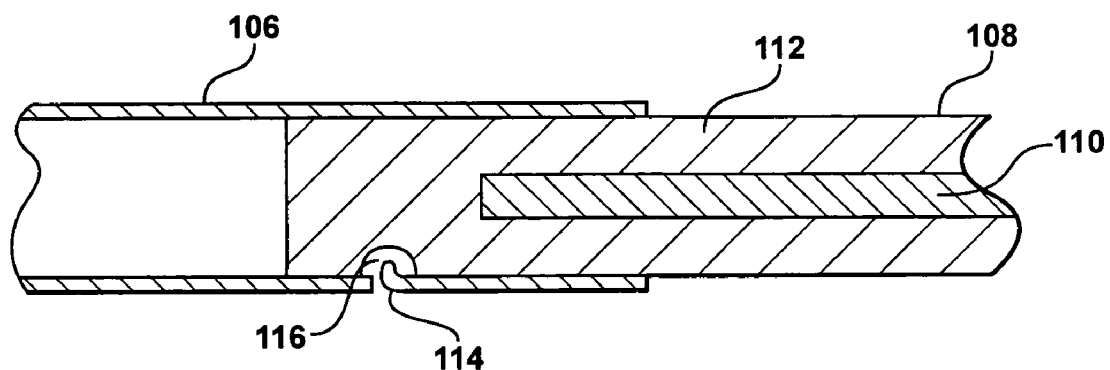
FIG. 12 is a cross-sectional view of a portion of a frame assembly of the present invention showing a portion of a connector engaged with a frame member having a retention feature.

As is shown in FIG. 12, the components of the system may be variously configured so as to facilitate the assembly of a frame structure. FIG. 12 is a cross-sectional view showing a portion of a frame member which is connected to a connector, a portion of which is shown at 108. In this embodiment, the connector 108 includes a core 110, which does not extend along the entire length of the exterior body 112, although this configuration is not essential for this embodiment. As is specifically illustrated in the figure, the frame member 106 is configured to include an inwardly projecting tooth portion 114 which may be formed by a metalworking operation such as piercing, stamping or the like. The connector 112 includes a groove 116 formed therein, and when the connector 112 is fitted into the frame member 106, the tooth 114 projects into the groove 116 locking the frame member 106 and connector 112 together. This locking action may suffice to hold the frame assembly together for ultimate use, or in those instances where high strength is required, this locking mechanism may be utilized to hold the two components in engagement until permanent affixation by means of welding, adhesives, other fasteners or the like may be achieved. The locking mechanism may also function as a locator which facilitates assembly of the frame by assuring that components are appropriately disposed.

It is to be understood that in other embodiments of the present invention, other locking mechanisms may be employed. For example, the frame member 106 may be configured to receive a projecting portion of a connector member 108. In other instances, the various components may be correspondingly threaded, provided with bayonet-type locks, or otherwise be configured so as to permit mechanical assembly thereof. In particular applications the connectors of the present invention will be configured to allow for initial relative movement of the frame members so that the shape of the frame can be adjusted. After adjustment, the connectors and frame members are immobilized by welding, use of adhesives, mechanical locks, screws, or the like.

Figure 13:
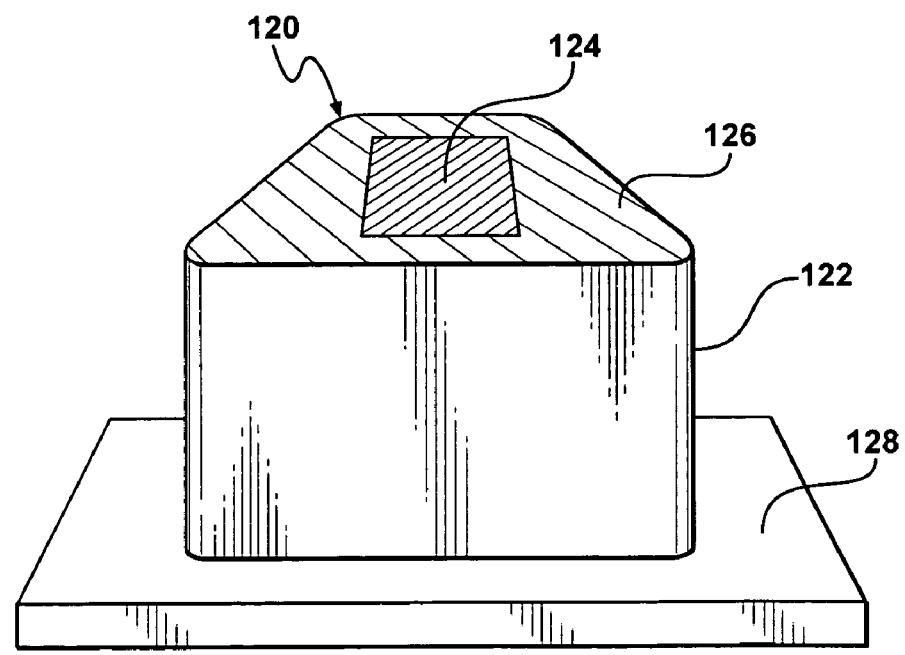
FIG. 13 is a perspective view of an auxiliary connector of the present invention.

In some instances, it may be desirable to affix portions of the space frame to members such as beams, rails, or exterior surfaces of frame members. In such instances, the system of the present invention may further include an auxiliary connector optimized for such affixation. One such connector 120 is shown in FIG. 13. This auxiliary connector 120 includes a connector body 122 which is generally similar to the connectors previously described insofar as it includes a core member 124 and an exterior body 126. The exterior profile of the connector body 122 is configured to engage with a frame member. The auxiliary connector 120 of FIG. 13 further includes a connector portion 128 which is configured to be attachable to a third member. As illustrated herein, the connector portion 128 is shown as being a flat plate which can be affixed to a rail, frame or other such structure by welding, adhesives, rivets, screws and the like. It is to be understood that the connector portion 128 may be otherwise configured depending upon particular applications. For example, the connector portion may be curved or otherwise irregular in shape, and it may include integral connector members therewith. In some instances, the connector portion 128 may be integral with the core 124, whereas in other cases it may not. Also, depending upon the particular application, the auxiliary connector 120 may be a simple unitary body and not a composite structure, and in that regard may not include the core and exterior body combination but may be a simple monolithic member.

Yet other configurations of frame assemblies and features may be utilized in accord with the present invention. For example, FIG. 14A shows a portion of a frame assembly 130 comprised of two frame members 132, 134 joined together by a connector 136, which is better illustrated in FIG. 14B. As is best seen in FIG. 14B, the connector 131 includes tabs 138a-138c which may be affixed to one frame member, for example frame member 132 in FIG. 14A. Such affixation may be by means of adhesives, welds, separate fasteners or the like. In particular instances, mechanical affixation may be achieved by appropriately configuring the connector and/or frame member. As will further be seen in FIG. 14B, the connector 136 includes a shelf portion 140 which is disposed so as to receive the frame member 134. As will be apparent to one of skill in the art, the connector 136 may be otherwise configured so as to accommodate frame members having different shapes and/or to allow for connection of ear members and/or different configurations of members. This connection system may be utilized in conjunction with, or independently of, the other features of this invention.

As will be apparent from the foregoing, other cross-sectional configurations and/or arrangements of tabs and sockets may be utilized in the present invention to provide connectors which allow for assembly of frame members into various frame configurations. Also, in some instances, the connectors may be manufactured so as to be integral with one of the frame members and engageable with at least one other thereof. In view of the foregoing, still other modifications and variations thereof will be readily apparent.

It is to be understood that the foregoing drawings, discussion and description are illustrative of specific embodiments of the invention, but they are not meant to be limitations upon the practice thereof. Yet other modifications and variations will be readily apparent to those of skill in the art. It is the following claims, including all equivalents, which define the scope of the invention.

The invention claimed is:

1. A frame system for a motor vehicle, said frame system comprising:
   a plurality of frame members, each frame member having a connector socket defined therein;
   a connector having an outer profile defining a first shape configured to engage the sockets of two of said plurality of frame members so as to connect said frame members in a fixed angular relationship, said connector being a composite body comprising:
   a core member, which has an outer profile defining a second shape; and
   an exterior body which covers at least a portion of said outer profile of said core member and defines at least a portion of the outer profile of said connector, wherein said first shape defined by said outer profile of said connector and said second shape defined by said outer profile of said core member are different shapes.

2. The frame system of claim 1, wherein said core and said exterior body are fabricated from different materials.

3. The frame system of claim 1, wherein said core is fabricated from a metal.

4. The frame system of claim 1, wherein said exterior body is fabricated from a polymer.

5. The frame system of claim 1, wherein said core is elongated along a linear axis and said exterior body covers substantially all of the length of said core.

6. The frame system of claim 1, wherein said exterior body covers only a portion of the core so that the uncovered portion defines a part of the outer profile of the connector.

7. The frame system of claim 1, wherein the exterior body defines all of the outer profile of the connector.

8. The system of claim 1 further including a plurality of said connectors.

9. The system of claim 1 further including an auxiliary connector which is configured to engage a connector socket of one of said frame members and is further configured to be attachable to a third member.

10. The frame system of claim 1, wherein said frame members are fabricated from metal.

11. The frame system of claim 1, wherein said frame members are fabricated by a roll-forming process.

12. The frame system of claim 1, wherein said frame members are heat treated so as to control their hardness.

13. The frame system of claim 12, wherein said frame members are heated to a temperature sufficient to effect a metallurgical transition, subjected to a shaping operation, and quenched.

14. The frame system of claim 1, wherein said frame members are heat treated so as to provide regions having different metallurgical properties.

15. The frame system of claim 1, wherein at least some of said plurality of frame members include an attachment member projecting therefrom.

16. The frame system of claim 1, wherein said connector includes a mechanical coupler which is integral therewith, said coupler being operative to retain the connector in engagement with a frame member.

17. The frame system of claim 1, further including an adhesive material disposed so as to affix a frame member to a connector.

18. The frame system of claim 1, further including a mechanical connector for affixing one of said frame members to said connector.

* * * * *

UNITED STATES PATENT AND TRADEMARK OFFICE
CERTIFICATE OF CORRECTION

PATENT NO. : 7,251,915 B2 Page 1 of 1
APPLICATION NO. : 11/223884
DATED : August 7, 2007
INVENTOR(S) : Jim Zimmerman et al.

It is certified that error appears in the above-identified patent and that said Letters Patent is hereby corrected as shown below:

Column 8, Line 54, Replace "aftachment" with -- attachment --

Signed and Sealed this

Fourth Day of December, 2007

JON W. DUDAS
*Director of the United States Patent and Trademark Office*